(12) United States Patent
John et al.

(10) Patent No.: US 12,509,400 B2
(45) Date of Patent: Dec. 30, 2025

(54) METHOD FOR LAYER-WISE MANUFACTURING OF A SHAPED BODY

(71) Applicants: Ivoclar Vivadent AG, Schaan (LI); IO Tech Group Ltd, London (GB)

(72) Inventors: Hendrik John, Buchs (CH); Michael Zenou, Hashmonaim (IL); Christian Ritzberger, Grabs (CH)

(73) Assignees: Ivoclar Vivadent AG, Schaan (LI); IO Tech Group Ltd., London (GB)

(*) Notice: Subject to any disclaimer, the term of this patent is extended or adjusted under 35 U.S.C. 154(b) by 1256 days.

(21) Appl. No.: 17/296,292

(22) PCT Filed: Sep. 23, 2019

(86) PCT No.: PCT/EP2019/075562
§ 371 (c)(1),
(2) Date: May 24, 2021

(87) PCT Pub. No.: WO2020/108821
PCT Pub. Date: Jun. 4, 2020

(65) Prior Publication Data
US 2022/0016707 A1   Jan. 20, 2022

(30) Foreign Application Priority Data
Nov. 29, 2018   (EP) .................................. 18209300

(51) Int. Cl.
*C04B 35/111*   (2006.01)
*B22F 3/10*   (2006.01)
(Continued)

(52) U.S. Cl.
CPC .......... *C04B 35/111* (2013.01); *B22F 3/1021* (2013.01); *B22F 10/28* (2021.01);
(Continued)

(58) Field of Classification Search
CPC ..... B29C 64/153; B29C 64/268; B28B 1/001; B23K 26/34; B23K 26/342; C23C 14/048;
(Continued)

(56) References Cited

U.S. PATENT DOCUMENTS 6,177,151 B1 * 1/2001 Chrisey ................. C23C 14/048
219/121.85
7,137,697 B2   11/2006 Lehmann
(Continued)

FOREIGN PATENT DOCUMENTS

DE   102016013317 A1 * 5/2018 ........... B29C 64/135
EP   2261184 A2   12/2010
(Continued)

OTHER PUBLICATIONS

Charipar, K. et al., "Laser-induced forward transfer (LIFT) of 3D microstructures," Journal, Laser 3D Manufacturing V, vol. 10523, pp. 1-6, 2018.
(Continued)

*Primary Examiner* — Vanessa T. Luk
(74) *Attorney, Agent, or Firm* — Ann M. Knab; Thad McMurray (57) ABSTRACT

A method for layer-wise additive manufacturing of a shaped body made up of slices of processed layers, including the steps:
creating a layer of a slurry, the slurry including binder, a dispersing medium and a particulate filler material,
solidifying the slurry layer,
directing electromagnetic radiation to the solidified layer for processing it by debinding and/or sintering, and
repeating the above-mentioned steps to successively build the shaped body.
A laser induced forward transfer (LIFT) process utilizing a laser to direct laser beam pulses acts on a coating of slurry
(Continued)

on a carrier to transfer droplets of slurry to a receptor surface to create the slurry layer which is then processed further by above-mentioned steps of solidifying, and debinding and/or sintering.

14 Claims, 5 Drawing Sheets

(51) Int. Cl.
*B22F 10/28* (2021.01)
*B28B 1/00* (2006.01)
*B33Y 10/00* (2015.01)
*C23C 14/04* (2006.01)
*C23C 14/28* (2006.01)
*B22F 12/43* (2021.01)

(52) U.S. Cl.
CPC .............. *B28B 1/001* (2013.01); *B33Y 10/00* (2014.12); *C23C 14/048* (2013.01); *C23C 14/28* (2013.01); *B22F 12/43* (2021.01)

(58) Field of Classification Search
CPC .......... C23C 14/28; B22F 10/20; B22F 10/25; B22F 10/28
See application file for complete search history.

(56) References Cited

U.S. PATENT DOCUMENTS

| | | |
|---|---|---|
| 8,047,021 B2 | 11/2011 | Schweiger et al. |
| 9,067,359 B2 | 6/2015 | Rohner et al. |
| 9,321,674 B2 | 4/2016 | Ritzberger et al. |
| 10,144,034 B2 | 12/2018 | Zenou |
| 2002/0197401 A1 | 12/2002 | Auyeung et al. |
| 2003/0017277 A1* | 1/2003 | Young .................... C23C 14/08 427/596 |
| 2009/0074987 A1* | 3/2009 | Auyeung ............... H05K 3/046 427/596 |
| 2015/0294872 A1* | 10/2015 | Molpeceres Álvarez ................... H10F 77/211 438/46 |
| 2017/0210142 A1* | 7/2017 | Kotler ................ B23K 26/0676 |
| 2018/0141235 A1 | 5/2018 | Guenster et al. |

FOREIGN PATENT DOCUMENTS

| | | |
|---|---|---|
| GB | 2526328 A | 11/2015 |
| JP | 6272710 B2 | 1/2018 |

OTHER PUBLICATIONS

Jinno, K. et al., "Room temperature impact deposition of ceramic by laser shock wave," Japanese Journal of Applied Physics, 57, pp. 1-6, 2018.

* cited by examiner

METHOD FOR LAYER-WISE MANUFACTURING OF A SHAPED BODY

CROSS-REFERENCE TO RELATED APPLICATIONS

This application is a National Stage application of International patent application PCT/EP2019/075562 filed on Sep. 23, 2019, which claims priority to European patent application No. 18209300.5 filed on Nov. 29, 2018, the disclosures of which are incorporated herein by reference in their entirety.

TECHNICAL FIELD

The present invention relates to a method for layer-wise additive manufacturing of a shaped body made up of slices of processed layers, said method comprising the steps:
creating a layer of a slurry, said slurry including binder, a dispersing medium and a particulate filler material, solidifying the slurry layer,
directing electromagnetic radiation to the solidified layer for processing it by debinding and/or sintering, and
repeating the above-mentioned steps to successively build the shaped body.

BACKGROUND

Additive manufacturing (AM) describes a class of techniques in which a three dimensional object or shaped body is directly generated from a virtual digital model (e.g. a CAD model) of the shaped body. In this model the shaped body is subdivided into a plurality of successive thin slices, each slice having a contour defined by the model. The construction process is performed by layer-wise adding material in layers, each layer being processed to have a contour defined by the digital mod-el. Eventually the stack of interconnected layers forms the shaped body which in some techniques has to be processed further (e.g. by debinding, sintering etc. to obtain the final product. Generally one distinguishes between the following process types:
Vat Photopolymerisation (Stereolithography SLA, Digital Light Processing DLP, Continuous Digital Light Processing CDLP);
Material Extrusion (Fused Deposition Modeling FDM);
Material Jetting (Material Jetting MJ, NanoParticle Jetting NPJ Drop on Demand DOD);
Binder Jetting (BJ);
Powder Bed Fusion (Multi Jet Fusion MJF, Selective Laser Sintering SLS, Direct Metal Laser Sintering/ Selective Laser Melting DMLS/SLM, Electron Beam Melting EBM)
Direct Energy Deposition (Laser Engineering Net Shape LENS, Electron Beam Additive Manufacturing EBAM); and
Sheet Lamination (Laminated Object Manufacturing LOM).

For the manufacturing of dental restorations made of glass, glass-ceramic, ceramic or metallic materials stereolithographic photopolymerization processes have been proposed, as for example described in WO 2010/045950 A1. The method described utilizes photopolymerizable binder which is mixed with a filler material, in this case ceramic powder. In the described method a construction platform is held vertically moveable above a tank bottom which is at least in part of the bottom area transparent. Below the tank bottom an exposure unit is provided for projecting light to an exposure area in a spatially selective manner. The construction platform is first lowered into the slurry of photopolymerizable material and ceramic filler material until a layer of slurry with a desired layer thickness remains between the production platform and the tank bottom. This layer is subsequently exposed in an area with a predetermined contour defined by the three-dimensional CAD model which causes solidification of the layer. After the production platform has been raised slurry is replenished from the surroundings and the production platform is lowered again in such a way that a layer with the desired thickness is defined between the layer formed last and the tank bottom. The latter two steps are repeated until a shaped body having the desired shape defined by the stack of cured layers has been produced. The spatially selective exposure by the exposure unit can be performed by a laser scanning the area to be solidified under the control of a control unit to solidify layer after layer, with the layer contours being defined by the digital CAD model of the shaped body. Alternatively exposure units with spatial light modulators can be utilized which comprise an array of exposure elements which can be selectively activated, for example in the form of a micromirror device or a liquid crystal display which is illuminated by a light source and spatially selectively project light to picture elements contained in the contour of the layer to be processed.

The term "contour" of a layer or of the resulting processed slice in the sense of the present invention does not imply that there is only one simply connected area with the contour as a boundary. The contour may comprise several contour components which define several areas of a layer or slice which are separate from each other or which may include inner boundary contour components surrounding inner void areas not belonging to the layer.

The shaped body formed in this manner is a green body which has to be further processed by debinding. For debinding the green body is heated up in a furnace to a temperature in the range 80° C. to 600° C., depending on the binder materials. At the elevated temperature the solidified binder (polymerized resin) is thermally decomposed into low molecular weight species which eventually escape as volatile gases such that the ceramic particulate material remains. This white body is finally subjected to densification by performing sintering by further application of heat in a furnace.

Another technique that can be utilized for manufacturing dental restorations is for example Selective Laser Sintering (SLS) of ceramic powders. Such technique typically involves spreading of the powder to be sintered to a thin layer as a dry powder by means of a roller or the like, and sintering the powder layer. It is a disadvantage that such powder layers have a relatively low density. For this reason it has already been proposed to form layers of slurry comprising a ceramic powder and a liquid dispersing medium. Such method is for example described in WO 2016/207241 A1. In this method a layer of a slurry is formed which contains ceramic particles suspended in a dispersing medium and binder. A laser light source projects a laser beam onto the slurry layer to solidify the slurry in an area having the contour of the slice to be added in this step. The laser beam evaporates the dispersing medium to solidify the layer. This deposition of laser energy is controlled in such a manner that it causes evaporation of the dispersing medium but does not cause sintering of the ceramic particles so that by adding slices successively in this manner a ceramic green body is formed. Eventually this green body has to be further processed by debinding and sintering.

The main disadvantages of existing slurry-based processes is that the debinding and sintering steps are time consuming, typically taking several hours up to days, depending on the size and shape of the green body because the volatile decomposition products of the binder have to diffuse from the inside to the outside of the shaped body and the diffusion path is not constant and differs from shaped body to shaped body in dependence on the size and shape of the shaped body. Therefore, the bigger the body generated the more critical is the debinding process in terms of risks of cracking and deformation.

Slurry-based processes which first generate a green body do require further separate process steps, namely debinding and sintering which are usually performed in dedicated furnaces and need, as mentioned above, substantial processing times.

A further technology of additive manufacturing that takes advantage of the higher particle densities that may be achieved with slurry layers is known as Layer-wise Slurry Deposition (LSD). LSD processes are for example described in "Slurry-based powder beds for the selective laser sintering of silicate ceramics", T. Mühler et al. J. Ceram. Sci. Tech., 06 [02] 113-118 (2015). A layer of slurry is created by applying slurry material on a substrate surface (if the first layer is to be formed) or on the surface of the last layer formed, and the applied slurry is levelled to a desired thickness by a doctor blade. Desiccation of a freshly deposited layer takes place by two main mechanisms: First, during and directly after deposition of the slurry layer the liquid solvent is drawn by capillary forces into the supporting powder compact formed by previously deposited layers and, second, by rapid evaporation of the solvent. The first mechanism ensures that a freshly deposited layer loses its liquid phase immediately after deposition. Therefore, the temperature for the supporting dry layers can be kept at a temperature significantly exceeding the boiling point of the solvent. After solidification by removal of the solvent any remaining binder is removed in a debinding step which is followed by a sintering step for densifying the newly added slice. The preamble of claim 1 is based on such a LSD process.

In LSD processes as described above it is complicated to use slurries of different compositions because this would require that for each type of slurry composition a separate container is provided and that a particular one has to be selected and moved to the application zone to supply the material for the next slurry layer. Even more complicated, if possible at all, are changes of the slurry composition within a slurry layer, e.g. to add a first slurry composition in a central area, and a second and possibly further slurry compositions in outer regions surrounding the central area of the layer being created.

EP 1 268 211 B1 discloses a printing process in which a focused laser beam locally supplies energy to a material to be printed which causes an instant temperature increase and volume expansion in the material which leads to the ejection of a droplet, in this case ink, which is deposited on a substrate to be printed on. This method is referred to as laser induced forward transfer (LIFT) process. The material to be printed is transferred from a so called donor to a receptor substrate. The donor consists of a carrier on which a thin coating of the material to be printed is applied. A focused laser beam pulse is acting on this layer which is thereby heated up instantly and partially evaporated. For transparent carriers the laser beam acts on the material to be printed by passing through the backside of the carrier and through the carrier to act on the material coating on the opposite surface of the carrier. If the carrier is not transparent or has a not transparent absorption layer at the interface with the material coating, the carrier is heated up at the interface with the material coating which leads to the energy transfer to the material to be printed. If the carrier layer is transparent the focused laser beam can act directly on the material to be printed. For this purpose the material to be printed may contain an energy transformation component which is capable of absorbing laser radiation and transforming it to thermal energy. By means of the laser energy pulse the material to be printed is locally abruptly heated up and partially evaporated, wherein the expanding vapour carries away a small amount of the material which is deposited on the receptor substrate which is facing the material coating on the carrier.

The generation of ceramic or glass-ceramic layers by a LIFT process is not known from the prior art.

SUMMARY

It is an object of the present invention to provide a method for layer-wise additive manufacturing of a shaped body utilizing layer-wise slurry deposition, which method facilitates use of different slurry compositions in the created slurry layer which is then further processed by solidifying and debinding.

This object is achieved by a method comprising the features of the claims. Preferred embodiments of the method are set in the dependent claims.

In a method of the present invention a shaped body is build up by adding slices of processed layers, each slice being formed by creating a layer of a slurry which includes binder, a dispersing medium and a particulate filler material, solidifying the slurry of the created layer, and directing electromagnetic radiation to the solidified layer for processing it by debinding and/or sintering. These steps are repeated for each in newly created layer of slurry on top of the last processed slice. According to the present invention a layer of slurry for the next slice to be formed is created in the following manner. The new slurry layer is added by a laser induced forward transfer (LIFT) process utilizing a laser to direct laser beam pulses to act on a coating of slurry on a carrier. In a LIFT process each laser beam pulse causes an instant local temperature increase of the slurry in the beam spot which results in an explosive ejection of a droplet of slurry material. The droplets are transferred to a receptor surface (a substrate surface in the case of the first created layer or the surface of the last processed slice in subsequent steps of the additive manufacturing method). The transferred droplets are formed in such a manner that they add up to a continuous layer which is then processed by solidifying, and processed further by debinding and/or sintering.

Said directing of electromagnetic radiation to the solidified layer is performed to deposit energy to increase the temperature to cause thermal processing for debinding and/or sintering the solidified layer. The electromagnetic radiation can for example be applied by a laser or by an infrared light source. The thermal processing may include only sintering in cases of slurries having a very low binder content so that there is no separate first debinding step but sintering already starts when the electromagnetic radiation is directed onto the solidified layer. Usually, this application of energy by directing electromagnetic radiation onto the solidified layer will be performed in a spatially selective manner so that the solidified layer is only further processed by debinding and/or sintering within the contour of the slice currently generated.

Utilizing a LIFT process for depositing the slurry for the next layer being added offers particular advantages. For the creation of the next layer laser beam pulses transfer droplets of slurry from a slurry coating on a carrier. The carrier can for example be a film. The carrier can carry slurry coatings of different compositions in different areas of the carrier which are located separately on the carrier. The process of LIFT transfer to the new layer being created can then be controlled by selectively moving the carrier relative to the receptor surface and the laser to bring desired slurry compositions to the transfer point where the laser beam is acting on the slurry coating to thereby transfer selected slurry compositions in a desired pattern to the layer of slurry being created. The principle of changing between different slurry compositions by effectively using different areas of the carrier with different slurry composition coatings for material transfer is comparable to the principle of a colour ribbon in a traditional colour typewriter, wherein the colour ribbon in the analogy corresponds to the coated carrier with different coating composition in different areas of the carrier.

In order to perform the LIFT process, the laser beam pulses act on the slurry coating on the carrier, wherein this interaction can be a direct or indirect interaction. In case of a direct interaction the laser beam pulses are directed onto the slurry coating which absorbs laser energy and is thereby heated up; the absorption can for example be enhanced by adding an energy transfer component to the binder, which energy transfer component is capable of absorbing laser radiation and of converting absorbed radiation energy into thermal energy. The laser beam can for example be directed onto the slurry layer by utilizing a transparent film as carrier and by directing the laser beam onto the backside of the carrier film opposite to the slurry coating. After passage through the transparent carrier film the laser beam enters the slurry coating to induce an instant temperature increase to eject slurry coating material. Alternatively, the laser beam can act on the slurry coating in an indirect manner by providing an absorption layer which is sandwiched between the carrier film and its slurry coating. Also in this case the laser beam is directed onto the backside of the transparent carrier film and is, after passage through the carrier film, absorbed in the absorption layer which is thereby rapidly heated up and which by thermal conduction causes a rapid temperature increase in the adjacent slurry coating to effect the ejection of droplets of slurry for the LIFT process.

It is preferred that the slurry layer is solidified by applying a gas flow to act on the slurry layer. This can for example be a tempered gas flow which lets vaporizable components of the slurry evaporate.

In an alternative preferred embodiment the slurry layer is solidified by directing electromagnetic radiation to act on the slurry layer.

In a preferred embodiment said directing of electromagnetic radiation is performed by controlling a laser to direct a laser beam to act on the layer material.

In a preferred embodiment the solidifying by directing the laser beam to act on the slurry layer is performed by heating up the slurry layer to vaporize vaporizable components of the slurry. For example, water-based slurries which contain a major portion of water as dispersing medium and only a minor amount of other binder materials as additives the evaporation of the water component is effectively drying and solidifying the slurry layer. Alternatively, for other dispersing media/binders which contain a major amount of photopolymerizable resin precursors the solidifying by directing a laser beam to act on the slurry is performed by inducing, by the laser radiation, polymerisation of the photopolymerizable precursor components of the binder to solidify the slurry layer.

It should be noted that the steps of solidifying and of debinding are not necessarily strictly separate steps. If for example solidification is performed by increasing the temperature of the slurry layer to evaporate the vaporizable dispersing medium the heat supply (for example by laser radiation) can be continuous and there may be an uninterrupted transition from solidifying to debinding, wherein both steps may partially overlap in time. There may be, depending on the materials involved, a temperature increase during the transition from the solidifying step to the debinding step. The same applies to the debinding and sintering steps, wherein there may be a continuous transition from the increased temperature treatment for debinding to the sintering phase. Also in this case the transition between the two process phases may involve increased laser energy supply to achieve higher temperatures for sintering, depending on the materials involved.

In principle the laser beams mentioned-above for effecting solidifying, and debinding and/or sintering can be generated by separate laser sources. However, in a preferred embodiment the same laser is used for effecting solidification of the slurry layer and for effecting debinding and/or sintering of the solidified layer.

It is also preferred that the laser generating the laser beam for effecting debinding and/or sintering and the laser beam used for the LIFT process to create a new slurry layer are generated by the same laser, whereas solidification could be effected by warm gas flow, an IR light source, by another laser or by any other means.

Alternatively the laser beam for effecting solidification and the laser beam used for the LIFT process to create a new slurry layer are generated by the same laser, whereas debinding and/or sintering is effected by another laser or by any other means.

However, it is particularly preferred that the laser, which is used for generating the laser beams for effecting solidifying, debinding, and/or sintering is the same laser that is used for the LIFT process to create a new slurry layer. In this embodiment a single laser source is involved in all application and processing steps to add a new slurry layer and to fully process it to the final processed state of the current slice added, and all steps are performed using same laser in the same device which allows to perform the method quickly and efficiently.

The combination of the deposition of the slurry using a laser based LIFT process with solidifying, debinding, and sintering allows to combine all process steps in an integrated processing device, i.e. no transfer of an intermediate state part to separate processing devices such as furnaces is necessary. Furthermore, solidification, debinding, and sintering are performed layer by layer. In addition, the same laser can be utilized to drive the LIFT process for slurry layer deposition, and for solidifying, and for debinding and/or sintering to form a slice of the shaped body before the next slurry layer is transferred and processed by the above-mentioned steps to form the next slice of the shaped body.

In a preferred embodiment the slurry further includes an energy transfer component capable of converting energy of the electromagnetic radiation into thermal energy.

In a preferred embodiment the carrier carries a plurality of separate slurry coating zones arranged next to each other, each coating zone containing an associated one of a plurality of slurry compositions. A control unit is arranged to control a positioning device for positioning the carrier relative to the laser beam and receptor surface such that for each layer of slurry being created by the LIFT process a selected spatial distribution of slurry compositions selected from the plurality of slurry compositions in the deposited layer is formed by selectively positioning coating zones to be effective in the LIFT process. In other words the positioning device allows to control in a spatially selective manner for each position of the slurry layer being created which slurry composition out of the plurality of slurry compositions is deposited. This allows to achieve a desired spatial pattern of slurry compositions in the created layer.

In a preferred embodiment the positioning device is capable of positioning the carrier relative to the laser and receptor such that the laser beam of laser can be directed onto the slurry layer without being affected by the carrier. The carrier can for example be moved by the positioning device to be out of the area of the beam paths from the laser to the slurry layer after the LIFT process. This permits effective application of the laser energy for further processing steps after the application of the slurry layer, namely for solidifying, and for debinding, and/or sintering of the layer.

In a preferred embodiment the slurry layer is created in an area that is larger than the region of the slice which is to be formed from the slurry layer by further processing of solidifying, debinding, and/or sintering, i.e. the slurry layer extends beyond the contour of the slice to be formed. In such embodiment it is preferred that during debinding and/or sintering of the solidified slurry layer the electromagnetic radiation is directed to the solidified slurry layer in a spatially selective manner so that debinding and/or sintering of the solidified layer takes place only within the contour of the slice to be built.

In the afore-mentioned embodiments the slurry surrounding the contours of the slices formed has the function of support material which laterally embeds the shaped body and which is eventually removed when building of the shaped body is completed. The slurry material surrounding the contours of the slices formed generally is solidified when the solidification step is performed in a spatially non-selective manner. In this case the solidified slurry forms a strong support structure embedding the shaped body laterally, which support structure may eventually be removed after completion of the building process, for example by application of a solvent.

Alternatively the creation of a slurry layer by the LIFT process is performed in a spatially selective manner such that the slurry layer is congruent with the contour of the slice to be build, and that support material applied to surround the contour of the slice to be built such that the shaped body to be formed is imbedded in support material. Typically, also in such cases the direction of electromagnetic radiation for effecting debinding and/or sintering is performed in a spatially selective manner to the areas defined by the contour of the slice to be built such that the support material is not affected by the electromagnetic radiation effecting debinding and/or sintering.

The particulate filler material of the slurry is for example glass-powder, glass-ceramic powder/ceramic powder or metallic powder.

The method of the present invention allows to integrate all processing steps as mentioned above to take place in a single device which can be of compact design and which can be operated to generate shaped bodies at high speed. The manufacturing of the shaped body according to the present invention can be performed in a single device, using the same laser for all process steps, without time consuming post-processing of a green body in additional devices such as a solidifying/debinding furnace and a sintering furnace. Furthermore, performing all steps of LIFT transfer of slurry, solidifying, debinding and sintering in a layer by layer manner allows to manufacture large shaped bodies, avoids deformation and inner tension as the process steps take place individually for each thin layer, in each case in a nearly 2D manner, and therefore does not involve large diffusion distances for the residual components to leave the thin layer during debinding. Since the debinding is also performed layer-wise, the conditions can be much better controlled since in a thin layer state gradients, such as temperature gradients, can be controlled in a much more effective manner.

For dental applications such as construction of dental restorations ceramic and metallic filler materials are of main interest. In this connection water-based slurries and slurries comprising mainly organic polymer precursor components as binder can be used. In water-based slurries also a certain amount of organic binder material is present. For the water-based slurries the process of solidifying the slurry mainly involves the evaporation of the water by applying heat to the slurry, whereas in slurries comprising mainly organic polymer precursor components solidification is performed by inducing polymerisation which in case of photopolymerizable binder components can be achieved by directing laser radiation on the slurry to be solidified.

An important property of slurries that are preferred to be processed by the method of present invention is a high content of particulate ceramic or glass-ceramic filler material.

In methods according to the present invention preferably slurries are used which comprise:
(a) ceramic and/or glass ceramic particles as particulate filler material,
(b) at least one binder,
(c) at least one energy transformation component, and
(d) at least one dispersing medium.

As ceramic and/or glass ceramic particles (a) ceramic and/or glass ceramic powders are suitable which, after thermal debinding and sintering, result in ceramic bodies having a desired strength, for example oxide or glass ceramic particles, such as for example aluminium oxide, zirconium oxide, or lithium disilicate particles. Preferred are particles having a particle size of less than 20 µm, particularly preferred less than 10 µm and even more preferred less than 5 µm. The particles are preferably non-agglomerated. Particularly preferred are particles having particle size from 3 nm to 20 µm, more preferred sizes are from 5 nm to 10 µm, and even more preferred are particle sizes from 7 nm to 5 µm.

Ceramics in the sense of the present application are inorganic materials having a crystalline structure which are typically made of corresponding powder materials. Preferred are ceramic particles based on $ZrO_2$ or $Al_2O_3$, particles based on CaO, $Y_2O_3$, $La_2O_3$, $CeO_2$ and/or MgO stabilized $ZrO_2$, particles based on other metal oxides or on ceramics made of a plurality of oxides and thus comprising different crystalline oxide phases, preferably $ZrO_2$—$Al_2O_3$, $ZrO_2$ spinel, $ZrO_2$—$Al_2O_3$ spinel, spinels of the type $AB_2O_4$, $AB_{12}O_{19}$, $AB_{11}O_{18}$, $AB_2O_4$, wherein A is preferably an alkali ion or an alkaline earth ion, and B is preferably a transition metal ion having a higher oxidation state than A. Particularly preferred are ceramic particles comprising $ZrO_2$—$Al_2O_3$, $ZrO_2$ spinel, $ZrO_2$—$Al_2O_3$ spinel or CaO, $Y_2O_3$, $La_2O_3$, $CeO_2$ and/or MgO stabilized $ZrO_2$—$Al_2O_3$.

Stabilized ceramics include besides a base oxide such as $ZrO_2$ or $Al_2O_3$ a stabilizing agent which is preferably selected from CaO, $Y_2O_3$, $La_2O_3$, $CeO_2$, MgO, $Er_2O_3$ and mixtures thereof. The stabilizing agent is preferably used in an amount of 2 to 14 mole %, relative to the mass of the stabilized ceramic. High-strength ceramics include for stabilizing the tetragonal and/or cubic crystal structure preferably 2 to 12 mole % $Y_2O_3$ (yttrium oxide), preferably 2 to 10 mole %. This $ZrO_2$ ceramic is referred to as Y-TZP (yttrium stabilized tetragonal zirconium dioxide polycrystals). Particularly preferred are ceramic particles which contain a base oxide and a stabilizing agent only.

Glass ceramics are materials which are typically obtained by controlled crystallization of amorphous glasses, in particular silicate glasses, and in which a glass phase and one or more crystal phases coexisting in the solid body. For glass ceramics one can start from glass powders as well as from glass ceramic powders. Particularly preferred are glass ceramic particles which contain Leucitecrystals, and particularly preferred lithium disilicate crystals. These can be made in a preferred manner from lithium disilicate glass powder or from lithium disilicate glass powders by thermal treatment (crystallization and sinter-firing). Preferred glass ceramics are described in detail in EP 1 505 041 A1, EP 2 261 184 A1, EP 2 377 830 A1 and EP 2 377 831 A1.

The optimal particle size of the component (a) depends on the ceramic used. For $Al_2O_3$ the size of the particles used as component (a) is in the range from 50 to 500 nm, particularly preferred between 75 and 200 nm; for glass ceramic in the range from 200 nm to 20 µm, particularly preferred in the range from 500 nm to 10 µm, and even more preferred in the range from 1 to 5 µm; for TCB-3Y zirconium dioxide in the range from 3 to 500 nm, particularly preferred in the range from 20 to 350 nm. The particle size is preferably selected such that the obtained slurries show sedimentation stability.

The slurries may contain as binder (b) one or more radically polymerizable monomers, preferably at least one (meth)acrylate and/or (meth)acrylamide, preferably mono or multifunctional (meth)acrylate or their mixtures. Particularly preferred are materials which contain as radically polymerizable monomer at least one multifunctional (meth)acrylate or a mixture of mono- and multifunctional (meth)acrylates. The term monofunctional (meth)acrylates is meant to cover compounds having one radically polymerizable group, the term polyfunctional (meth)acrylates is meant to cover compounds having two or more, preferably 2 to 6, radically polymerizable groups. Preferred binders of this type are described in EP 3 147 707 A1 in the paragraphs [0036] to [0044]. It is also disclosed there that such binders preferably contain a photo initiator.

It is preferred to use slurries which include a non-reactive binder, i.e. a binder which is not radically polymerizable. In contrast to reactive binders, non-reactive binders do not form a polymer network with covalent bonds upon solidification. For this reason the ceramic and/or glass ceramic particle (a) can shift with respect each other and in this manner at least partially release tensions during drying and/or debinding.

Binders which in pure form are solid at 25° C. are preferred. During the drying process such binders solidify and provide for a higher strength of the green body.

Preferred binders are cellulose derivatives such as methylcellulose (MC), hydroxyethylcellulose (HEC), hydroxypropylmethylcellulose (HPMC) and hydroxybutylmethylcellulose (HBMC) as well as sodium carboxymethylcellulose (NaCMC) and cellulose derivatives.

Further examples of preferred binders are polyvinyl alcohol (PVA), polyvinyl acetate (PVAc); and polyvinyl pyrrolidone (PVPP). Other examples are polymethylmethacrylate (PMMA) and copolymeres of ethylene glycol and propylene glycol which have a molecular weight which is high enough and/or a relative high amount of polyethylene glycol such that they are solid at room temperature.

The energy transformation component (c) absorbs a major portion of the energy of the applied energy pulse, for example of the incoming laser beam, and converts the absorbed energy to heat. The heat pulse generated in this manner is transferred to a volume expansion component and causes an instantaneous expansion thereof, for example causes instantaneous generation of microscopic gas bubbles by evaporation of the volume expansion component. In this manner the transfer of the slurry from the carrier substrate to the receptor substrate in the lift process is induced. The slurry is deposited on the receptor substrate.

The energy transformation component (c) is selected depending on the wavelengths of the laser light to be absorbed. In connection with the present invention inorganic, and in particular organic dyes and pigments are preferred. Particularly preferred are dyes and pigments which allow burning off without residues and which after debinding and sintering leave no residues in the built body.

In connection with the present invention the slurries contain as dispersing medium (d) a liquid component in which the ceramic and/or glass ceramic particles (a) are dispersed. Preferred are dispersing media which in pure form are liquid at 25° C. Preferred dispersing media are organic solvents or alternatively water.

A mixture of different liquids can be used as dispersing medium. The dispersing medium includes at least one low boiling component and preferably in addition one or more high boiling point components.

Low boiling point components are understood here to be solvents having a boiling point of less than 200° C. (at normal pressure). Suitable solvents are for example acetic acid butylester and acetic acid-n-hexylester. Preferred low boiling point solvents are 1-octanol, propylene glycol diacetate, ethylene glycol diacetate, acetone, methyl ethyl ketone (MEK), isopropanol, ethanol, butanol, p-xylene, cyclohexanone, butylacetate, pentylacetate, hexylacetate, and particularly preferred water. Water has the advantage that during evaporation no vapours are generated which could be hazardous to health or explosive.

High boiling point components are understood in this application to be solvents having a boiling point above 200° C. (at normal pressure). Preferred high boiling point solvents are liquid poly(ethylene glycols) having a molecular weight between 150 and 600 g/mole propylene glycol, dipropylene glycol, tripopylene glycol, poly(propylene glycol) having a molecular weight from 150 to 4000 g/mole, particularly preferred with a molecular weight from 150 to 600 g/mole, ethers thereof such as methyl, ethyl, propyl, isopropyl, butyl, hexyl ether, either as mono ether or di-ether; phthalates such as dimetyl, diethyl, dibutyl phthalates; glycerol; dimethyl, diethyl, dipropyl, dibutyl adipates or glutarates; and diethyl succinate.

For combining with waters polar, high boiling point solvents such as polyethylenglycol (average molecular weight<600 g/mol), glycerol and 1,2-propanediol.

Water-based slurries have of course a much lower content of organic binder than polymer precursor based slurries. The lower content of organic binder in water-based slurries has the advantage of a faster debinding process because less binder has to be removed from the slurry, and the temperature needed for thermally decomposing the binder is lower than for cured photopolymers.

The preferred content of organic binder in water-based slurries is in arrange of 0.1-5 weight %, preferred 0.1-3 weight % and a especially preferred 0.1-2 weight % based on the total amount of slurry. In water-based slurries the organic binder has the function as humectants in the slurry and serves to prevent the slurry from drying to fast. These water absorbing binders also need less energy to be removed as they are watersoluble but not volatile polymers, wherein PEG for example has a decomposition temperature of about 150° C. Due to the fact that the melting temperature of those humectants differs depending on their chain length, it makes sense to use a combination of binders with different chain lengths to adjust the debinding process within the material layer. The different binders melt a different temperature and then decompose at different temperature levels which effect a spreading of the melting/decomposition over a longer period of time in which the required temperature increase to the maximal temperature takes place. For this reason less tension is generated during the debinding process.

BRIEF DESCRIPTION OF THE DRAWINGS

The invention will now be described with reference to preferred embodiments illustrated in the drawings in which.

DETAILED DESCRIPTION

The sequences of FIGS. 1A-1C, 2A-2C, 3A-3C, and 4A-4C in each case show steps of a layer-wise additive manufacturing method according to embodiments of the present invention.

Figure 1A:
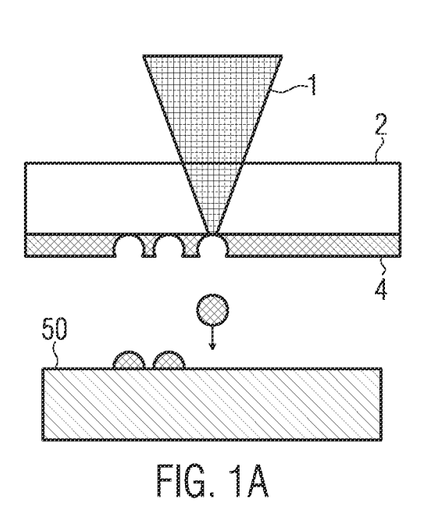
FIGS. 1A-1C show cross-sectional views illustrating creation of a slurry layer by a laser induced transfer process (LIFT process)
Figure 1B:
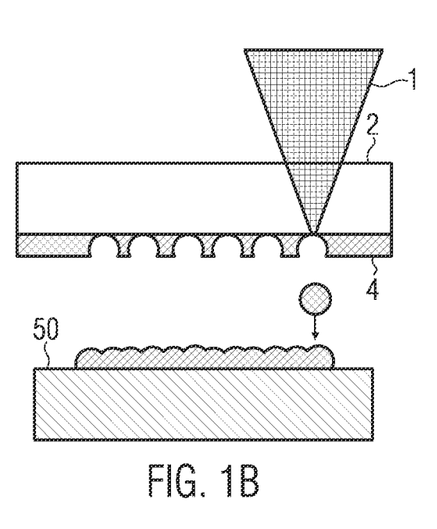
Figure 1C:
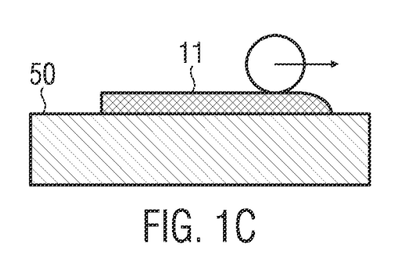

FIGS. 1A-1C schematically illustrate the generation of a slurry layer on a substrate 50 by performing a LIFT process. As shown in FIG. 1A the deposition of a slurry occurs drop by drop. A laser beam 1 is focused on an interface between a carrier 2 and a slurry coating 4 applied to the carrier. In the illustrated example the carrier 2 is a transparent film. A droplet of the slurry is released and deposited on the substrate 50 by a laser beam pulse, having a duration of typically 100 ns and an energy of less than 1 µJ (micro Joule). To apply a continuous layer it is necessary to move the carrier 2 relative to the laser beam 1 and to move the substrate 50 relative to the laser beam 1 to cover an area of the substrate surface continuously with overlapping droplets, as shown in FIG. 1B. After the slurry layer has been deposited on the substrate 50 is smoothed and planarized to form an applied slurry layer 11, for example by moving a rod at a defined level over the surface of the substrate 50, as shown in FIG. 1C.

For effective transfer the energy of the laser beam 1 to the slurry coating 4 the slurry of the slurry coating 4 may include an admixture of an energy transfer component which effectively absorbs the radiation of the laser beam 1 and converts it to thermal energy. Alternatively, the carrier may include a laser radiation energy absorber and converter, for example in the form of an absorption layer on the surface of the carrier which is facing the slurry coating. In the later case laser radiation energy is converted to thermal energy in the absorption layer directly at the interface of the slurry coating and the carrier.

Figure 2A:
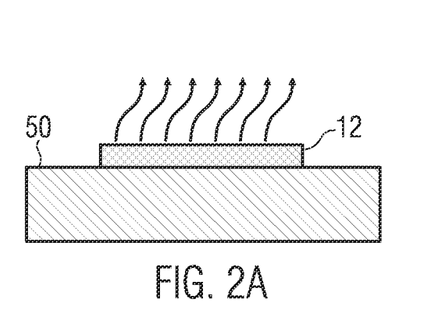
FIGS. 2A-2C show cross-sectional views illustrating processing of the slurry layer by solidifying, debinding, and sintering, respectively.
Figure 2B:
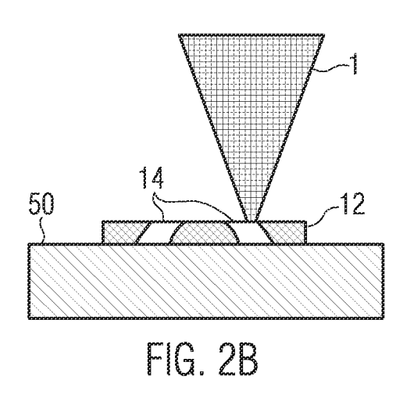
Figure 2C:
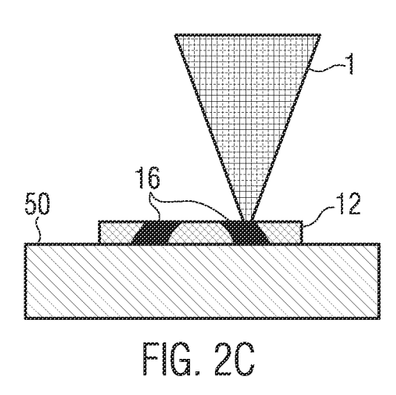

FIGS. 2A-2C schematically illustrate further processing steps being performed on the slurry layer 11 applied on the substrate 50 as shown in FIG. 1C. In this example a water based slurry is considered, i.e. a major portion of the liquid phase of the slurry is water including a minor portion of other binder materials. In this case solidifying the slurry layer is performed by heating up the slurry layer to let the water component of the slurry evaporate. The solidification by drying is effected by uniformly heating the layer in this example, and by removing moisture by gas circulation such as heated gas flow, or the combination of a flash lamp and gas flow. In principle any way of heat supply can be used to evaporate the water from the slurry. In a preferred embodiment, however, heat is supplied by directing the laser beam 1 onto the slurry layer (not shown in FIG. 2A) to heat it up by laser energy absorption.

By removing all water a solidified slurry layer 12 is obtained. The next processing step is illustrated in FIG. 2B, wherein in FIG. 2B the process of debinding is illustrated in which the laser beam 1 is acting on the solidified slurry layer 12 in a spatially selective manner to create debinded areas 14 defined by the contour of the slice to be generated in this step. The process of debinding is performed by heating the solidified slurry layer 12 in the selected areas to cause thermal decomposition of remaining binder, wherein the decomposition products of lower molecular weight eventually escape as gases. The debinding is performed by illuminating the area as defined by the contour for this slice to be added by burst of laser pulses, preferably at 10 kHz with a pulses duration of 5 ns and with an energy of 20 µJ.

In FIG. 2C the debinded areas 14 shown in FIG. 2B are subjected to a further process step in which the laser beam is directed onto the layer in a spatially selective manner onto the debinded areas 14 to supply further laser energy there. By further heating up the debinded areas the remaining particulate filler material (for example ceramic or glass-ceramic powder) is densified by sintering to form the sintered areas 16 of FIG. 2C.

The sintering also uses a burst of laser pulses, preferably at 300 kHz with pulse duration of 250 ns and with a pulse energy of less than 5 µJ.

Figure 3A:
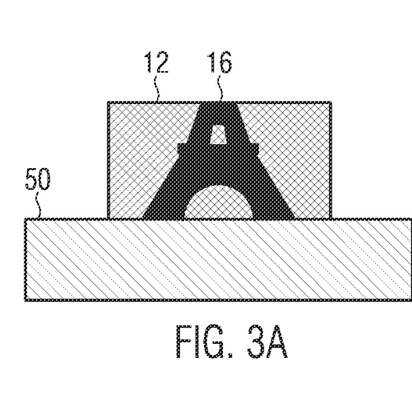
FIGS. 3A-3C show cross-sectional views illustrating the building process of a shaped body.
Figure 3B:
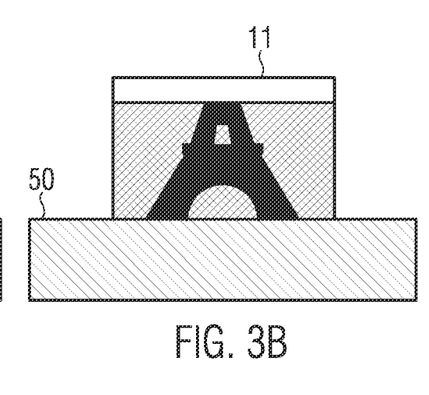
Figure 3C:
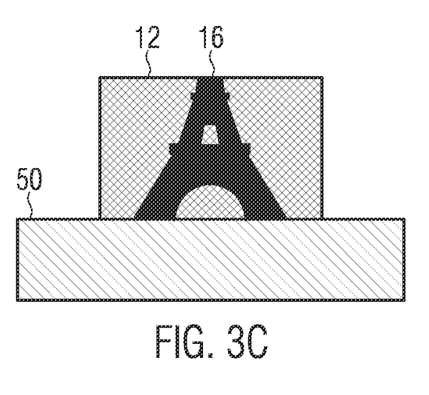

FIGS. 3A-3C illustrate how the building process proceeds further. In FIG. 3A the last supplied slurry layer has undergone processing by solidifying the last applied slurry layer, by selectively debinding the area defined by the contour of the slice to be added, and by sintering the debinded area of the layer to form sintered slice 16. Thereafter, a further slurry layer 11 is applied (by the steps as illustrated in FIGS. 1A-1C), and then processed by steps as illustrated in FIGS. 2A-2C to form a further sintered added slice 16 as shown in FIG. 3C.

Figure 4A:
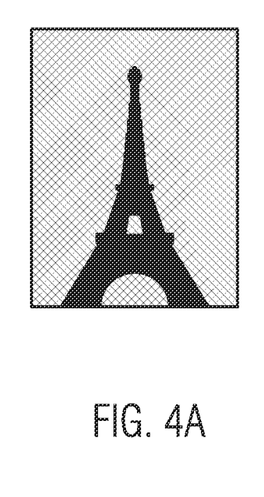
FIGS. 4A-4C show cross-sectional views illustrating further processing steps after the actual building process has been completed.
Figure 4B:
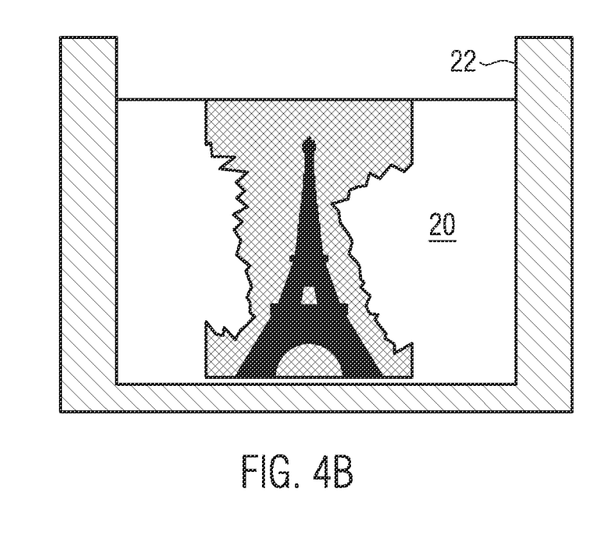
Figure 4C:
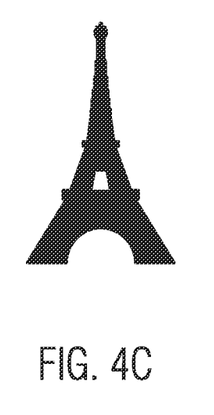

As has already been indicated in FIGS. 1A-1C and 2A-2C the slurry layer is applied in an area larger than needed for the shaped body to be built. By selectively processing (debinding and/or sintering) only the desired area defined by the contour of the slice to be added as shown in FIGS. 2B and 2C the shaped body continues to be built up slice by slice, wherein solidified slurry material remains to surround the processed slice portions of the shaped body being built, which surrounding solidified slurry serves as support material which laterally embeds the shaped body during the building process. By repeating the steps as illustrated and described before the shaped body is eventually completely built up as shown in FIG. 4A. Thereafter, the solidified material surrounding the constructed shaped body is removed, for example by dissolving it using a solvent, as indicated by the solvent 20 in the vat 22 in FIG. 4B. Eventually, the desired shaped body is obtained in this manner as shown in FIG. 4C.

Figure 5A:
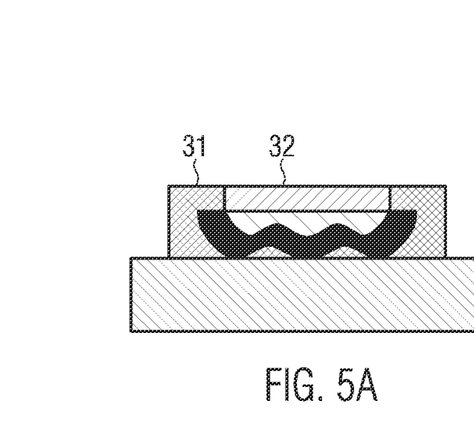
FIGS. 5A-5C show cross-sectional views illustrating a building process using different slurry compositions in the build-ing process of shaped body.
Figure 5B:
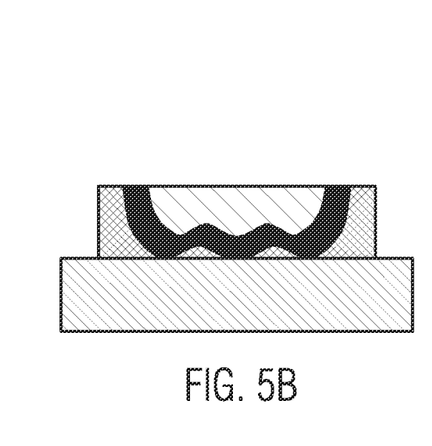
Figure 5C:
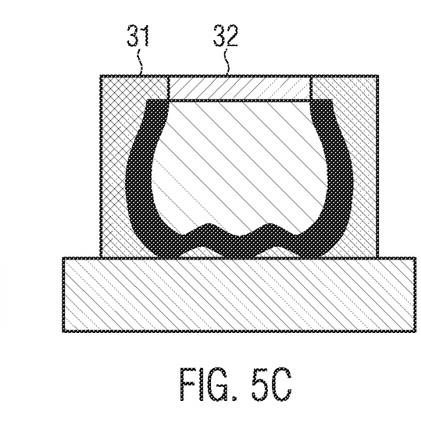

FIGS. 5A-5C illustrate a manufacturing method as described before, but in this case using two different slurry compositions 31, 32 in the building process. In FIG. 5A a new slurry layer has been applied which comprises a first slurry composition 31 in an outer or peripheral region of the applied layer, and a second slurry composition 32 in a central region of the layer. This newly added layer 31, 32 is then processed by solidifying, debinding and/or sintering (as illustrated for a uniform slurry material in FIGS. 2A to 2C). The processed area of the first slurry composition is shown in FIG. 5B in black, and the processed area of the second slurry composition 32 of FIG. 5A is shown in FIG. 5B by oppositely inclined hatching compared to the slurry 32. In this manner a shaped body is built up slice by slice which has a first ceramic or glass-ceramic composition in the outer shell, and has a second ceramic or glass-ceramic composition in the core region of the shaped body as shown in FIG. 5B. In FIG. 5C a new layer of first and second slurry compositions 31, 32 has been deposited which is then processed in the same manner as shown in and described above in connection with FIGS. 5A and 5B, and these steps are repeated until the shaped body has been built up completely.

Figure 6A:
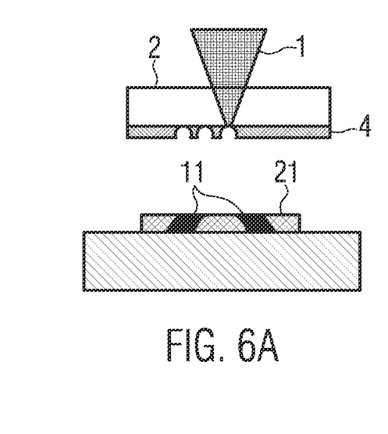
FIGS. 6A-6D show cross-sectional views illustrating processing steps of slurry layer deposition, solidifying, debinding, and sintering.
Figure 6B:
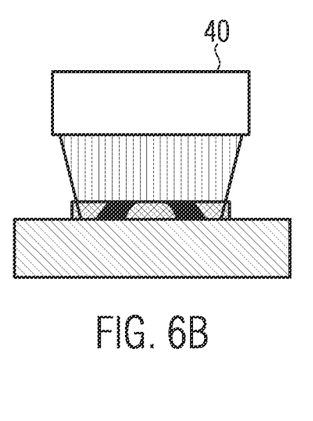
Figure 6C:
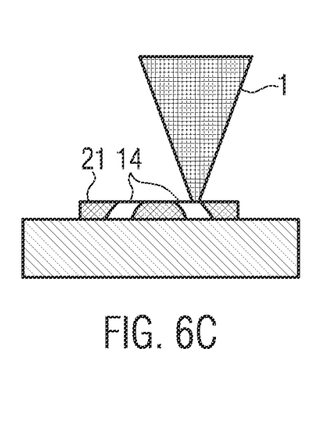
Figure 6D:
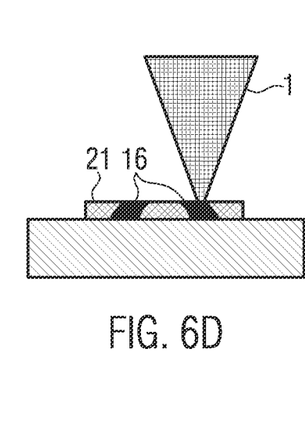

FIGS. 6A-6D illustrate a further embodiment of the method of the invention. In FIG. 6A a slurry layer is applied in a manner corresponding to the LIFT process illustrated in FIGS. 1A-1C, with the difference that in the case of FIG. 6A the slurry layer is not deposited as a continuous layer but in a spatially selective manner only in the areas defined by the contour of the slice to be added, in this case in the slurry layer areas 11. The areas surrounding the slurry layer 11 are filled with support material 21 which is likewise deposited by the LIFT procedure using a different zone of the carrier 2 or a different carrier which has a support material coating. The slurry in this example is a slurry having a binder containing mainly photopolymerizable components and a ceramic filler. The support material 21 may likewise be a photopolymerizable material. In FIG. 6B an exposure unit 40 irradiates the slurry layer 11 and the support material 21 by UV radiation which induces polymerization of the binder of the slurry and polymerization of the support material. In the next step the solidified slurry area 11 is processed by applying spatially selectively laser energy to these areas to cause debinding in a manner corresponding to the process shown in and described in connection with FIG. 2B. In this manner a debinded layer areas 14 are formed in FIG. 6C. The debinded areas 14 of FIG. 6C are then further processed by supplying laser beam pulses in a manner as shown in and described in connection with FIG. 2C to eventually form the sintered slice areas 16 surrounded by support material 21. These steps of FIG. 6A-6D are repeated in a manner corresponding to FIGS. 3A-3C to eventually build up the complete shaped body corresponding to FIG. 4A. Finally the support material is removed, for example by an appropriate solvent in a way corresponding to FIG. 4B to eventually obtain a shaped body as shown in FIG. 4C.

Figure 7:
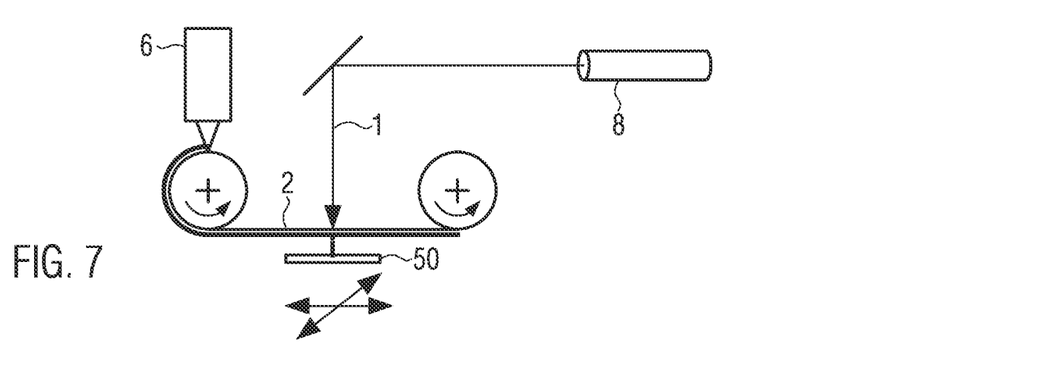
FIG. 7 shows a schematic side view illustrating components of a device for carrying out the method of the present invention.

FIG. 7 shows a simplified and schematic side view of a device for carrying out a method of the present invention. The device includes a laser 8 which directs, via an adjustable mirror, laser beam 1 onto carrier 2. The carrier 2 is in this example a transparent film which is unwound from a roller and which is wound up on a spaced apart second roller. The rollers are rotated, under the control of the control unit (not shown), in a controlled manner to move the carrier 2 with respect to the laser beam 1 and the substrate 50. The double arrows below substrate are intended to indicate that the substrate is movable by drivers of a positioning device with respect to the carrier 2 and the laser beam 1. A cartridge 6 contains a slurry, which container comprises an applicator capable of applying a stripe of slurry coating 4 of defined thickness onto the carrier 2.

Figure 8:
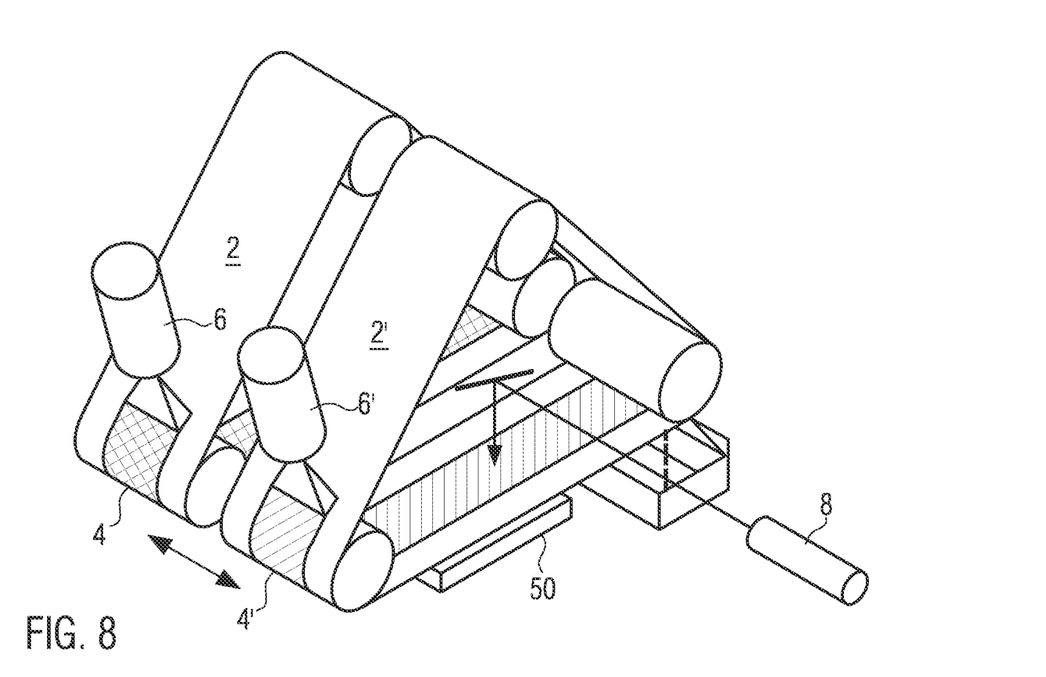
FIG. 8 shows a schematic perspective view of a device for carrying out a method of the present invention.

A similar device is illustrated in the schematic perspective view of FIG. 8. In this embodiment two carrier units are provided, the first comprising a closed loop of a carrier 2 and three rollers around which the carrier 2 is guided and the second comprising a closed loop of a carrier 2' and three rollers around which the carrier 2' is guided. The first carrier unit is provided with a cartridge 6 containing a first slurry composition 4, and the second carrier unit is provided with a second cartridge 6' containing a second slurry composition 4'. The cartridges 6, 6' have applicators which apply a stripe coating of slurry compositions 4, 4', respectively, on the respective carriers 2, 2'. A positioning device serves to move the carrier units and the substrate relative to each other, as indicated by the double arrow in order to selectively apply slurry composition 4 or 4' by the LIFT process on the receptor surface (substrate surface or upper surface of the last formed and processed layer). In these manner slurry compositions 4, 4' can be applied on the receptor surface in a spatially selective manner to obtain a spatial distribution of the slurry compositions 4, 4' as desired.

Figure 10:
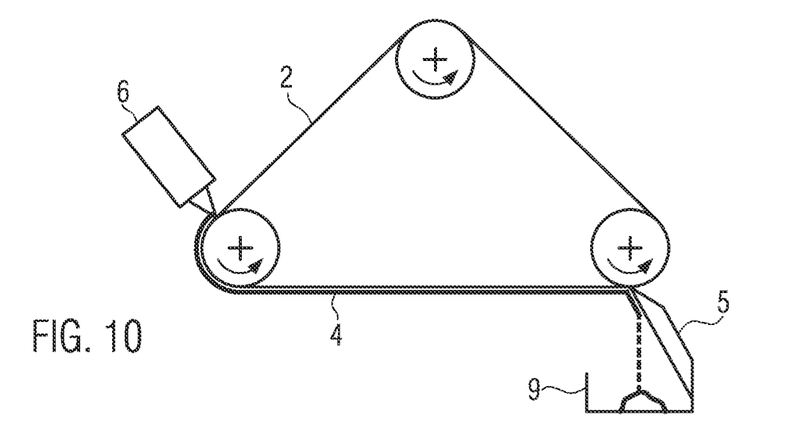
FIG. 10 shows a schematic side view of a further embodiment similar to the device of FIG. 8 for carrying out a method of the present invention.

FIG. 10 shows a side view of a carrier unit similar to the carrier units of FIG. 8. This view illustrates that the cartridge 6 with its applicator applies slurry composition 4 onto the carrier which is then rotated around the three rollers under the control of a control unit, wherein the positioning of the carrier effected in this manner is part of the controlled positioning device for controlling the relative position of carrier 2 and substrate 50. FIG. 10 further shows a wiper 5 which wipes off slurry composition 4 left over in the preceding LIFT process steps which wiped off remaining slurry is collected in a vat 9.

Figure 9:
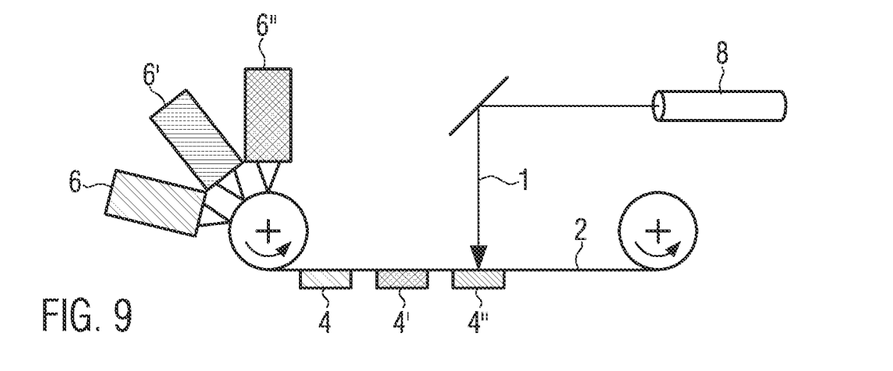
FIG. 9 shows a schematic side view of a further embodiment of a device for carrying out a method of the present invention.

FIG. 9 shows a further schematic illustration for a device for carrying out a method of the present invention, wherein the device is similar to the one shown in FIG. 7. In this case there are three cartridges 6, 6', 6" containing a first, second, are third slurry compositions 4, 4", 4', respectively which are applied in a selective and controlled manner onto the carrier 2 to provide zones of slurry coatings on the carrier, wherein the zones are provided with different slurry compositions. The rollers shown are rotated by the control unit in a selective manner such that during the LIFT process different slurry compositions are selected in a spatially selective manner to obtain a desired distribution of slurry compositions in the layer created by the LIFT process.

The invention claimed is:

1. A method for layer-wise additive manufacturing of a shaped body made up of slices of processed layers, said method comprising the steps of:
    creating a layer of a slurry, said slurry including binder, a dispersing medium and a particulate filler material,
    solidifying the slurry layer,
    directing electromagnetic radiation to the solidified layer for processing it by debinding and/or sintering, and
    repeating the above-mentioned steps to successively build the shaped body,
    wherein said step of creating a slurry layer is performed by a laser induced forward transfer (LIFT) process utilizing a laser (8) to direct laser beam (1) pulses to act on a coating (4) of slurry on a carrier (2) to transfer droplets of slurry to a receptor surface to create the slurry layer (11) which slurry layer (11) is then processed further by the steps of solidifying, and debinding and/or sintering,
    wherein the carrier (2) carries a plurality of separate coating zones (4, 4', 4") arranged next to each other, each coating zone (4, 4', 4") containing an associated one of a plurality of slurry compositions, and
    wherein a control unit is arranged to control a positioning device for positioning the carrier (2) relative to the laser (8) and the receptor surface such that for each layer of slurry being created a selected spatial distribution of slurry compositions selected from the plurality of slurry compositions in the created slurry layer is formed by selectively positioning coating zones (4, 4', 4") to be effective in the LIFT process to achieve a desired spatial pattern of slurry compositions in the created slurry layer.

2. The method according to claim 1,
    wherein said step of solidifying the slurry layer (11) is performed by applying heat from a warm gas flow to act on the slurry layer.

3. The method according to claim 1,
    wherein said step of solidifying of the slurry layer (11) is performed by directing electromagnetic radiation to act on the slurry layer.

4. The method according to claim 1,
    wherein said step of directing the electromagnetic radiation is performed by controlling a laser (8) to direct a laser beam to act on the solidified layer.

5. The method according to claim 1,
    wherein said step of solidifying the slurry layer is performed by directing a laser beam to act on the slurry layer for heating up the slurry layer (11) to vaporize vaporizable components of the slurry.

6. The method according to claim 5,
    wherein the laser (8) generating the laser beam (1) for effecting solidification and the laser beam used for the LIFT process to create a new slurry layer are generated by the same laser.

7. The method according to claim 5,
    wherein said directing electromagnetic radiation to the solidified layer for processing it by debinding and/or sintering is performed by controlling a laser to direct a laser beam on the solidified layer,
    wherein the laser beam (1) causing solidification of the slurry layer and the laser beam (1) for processing the solidified layer by debinding and/or sintering are generated by the same laser (8).

8. The method according to claim 7,
    wherein the laser beam (1) for processing the solidified layer by debinding and/or sintering and the laser beam used for the LIFT process to create a new slurry layer (11) are generated by the same laser (8).

9. The method according to claim 7,
    wherein the laser (8) generating the laser beams (1) for effecting solidifying and for effecting debinding and/or sintering are generated by the same laser (8) that is used for the LIFT process to create a new slurry layer (11).

10. The method according to claim 1,
    wherein the slurry further includes an energy transfer component configured for converting energy of the electromagnetic radiation into thermal energy.

11. The method according to claim 1,
    wherein the positioning device is configured for positioning the carrier (2) relative to the laser (8) such that the laser beam of the laser is directed onto the slurry layer without being affected by the carrier.

12. The method according to claim 11,
    wherein said steps of creating a slurry layer and solidifying the slurry layer are performed in an area that is larger than the region of the slice to be formed from the slurry layer (11), and
    wherein debinding and/or sintering of the solidified layer is performed by directing electromagnetic radiation to act on the solidified layer in a spatially selective manner so that debinding and/or sintering takes place only within the contour of the slice to be built.

13. The method according to claim 11,
    wherein said step of creating a slurry layer (11) is performed by the LIFT process in a spatially selective manner such that the slurry layer is congruent with the contour of the slice to be built, and
    wherein support material (21) is applied to surround the region of the slice to be built such that the shaped body to be formed is at least partially embedded in support material (21).

14. The method according to claim 1,
    wherein the particulate filler material of the slurry is glass-powder, glass-ceramic powder, ceramic powder or metallic powder.

* * * * *